(12) United States Patent
Bolozdynya et al.

(10) Patent No.: US 6,924,487 B2
(45) Date of Patent: Aug. 2, 2005

(54) NEUTRON DETECTOR

(75) Inventors: Alexander I. Bolozdynya, St. Petersburg, FL (US); John D. Richards, Safety Harbor, FL (US); Anatoli Arodzero, Palm Harbor, FL (US)

(73) Assignee: Constellation Technology Corporation, Largo, FL (US)

( * ) Notice: Subject to any disclaimer, the term of this patent is extended or adjusted under 35 U.S.C. 154(b) by 358 days.

(21) Appl. No.: 10/261,714

(22) Filed: Oct. 1, 2002

(65) Prior Publication Data

US 2004/0061047 A1 Apr. 1, 2004

(51) Int. Cl.$^7$ ................................................ G01T 3/06
(52) U.S. Cl. ........................... 250/390.01; 250/390.03; 250/390.11; 250/370.05
(58) Field of Search ...................... 250/390.1, 390.03, 250/390.12, 370.05, 390.11

(56) References Cited

U.S. PATENT DOCUMENTS

| | | | |
|---|---|---|---|
| 3,102,198 A | | 8/1963 | Bonner |
| 3,581,091 A | * | 5/1971 | Meijer .................... 250/370.05 |
| 4,931,649 A | * | 6/1990 | Czirr et al. ............. 250/390.07 |
| 5,083,026 A | | 1/1992 | Elbaum |
| 5,155,366 A | | 10/1992 | Miller |
| 5,231,290 A | * | 7/1993 | Czirr et al. ............. 250/390.11 |
| 5,298,756 A | * | 3/1994 | McCollum et al. ..... 250/390.07 |
| 5,399,863 A | * | 3/1995 | Carron et al. .......... 250/370.05 |
| 5,734,689 A | * | 3/1998 | Copeland et al. ........... 376/153 |
| 5,880,469 A | | 3/1999 | Miller |
| 5,880,471 A | | 3/1999 | Schelten et al. |
| 5,940,460 A | | 8/1999 | Seidel et al. |
| 5,973,328 A | | 10/1999 | Hiller et al. |
| 6,011,266 A | | 1/2000 | Bell |
| 6,054,708 A | | 4/2000 | Shimizu |
| 6,075,261 A | | 6/2000 | Hossain et al. |
| 6,100,530 A | | 8/2000 | Kronenberg et al. |
| 6,107,632 A | | 8/2000 | Lind |
| 6,420,712 B1 | * | 7/2002 | Menlove et al. ........ 250/390.01 |
| 6,812,469 B2 | * | 11/2004 | Katagiri ...................... 250/368 |
| 2003/0160178 A1 | * | 8/2003 | Katagiri .................. 250/390.11 |

* cited by examiner

*Primary Examiner*—Albert Gaglairdi
(74) *Attorney, Agent, or Firm*—Larson & Larson, P.A.; Herbert W. Larson

(57) ABSTRACT

A neutron detector is provided which is able to measure thermal neutron radiation within a gap filled with a substance that permits scintillation in the absorption of thermal neutron radiation, the gap being formed between at least a first and second spaced apart photodetector working in electrical coincidence. The substance disposed within the gap can be either a gas, liquid or solid. In the case of a gas, a shell is used so that the gas can be retained and kept under pressure. The neutron detector is able to differentiate between gamma radiation and neutron energy. An alternate embodiment of the novel detector includes a device which employs a plurality of detectors surrounding a moderator which can be used to measure both thermal and high energy neutrons.

20 Claims, 3 Drawing Sheets

NEUTRON DETECTOR

GOVERNMENT LICENSE RIGHTS

This invention was made with U.S. Government support under contract or grant DTRA01-99-C-0187 awarded by the U.S. Department of Defense, Defense Threat Reduction Agency. The U.S. Government has certain rights in the invention.

BACKGROUND OF THE INVENTION

1. Field of the Invention

This invention relates to neutron detectors. More specifically, it refers to a neutron detector capable of measuring neutron radiation wherein at least two photodetectors are employed, spaced apart by a gap between them wherein a substance is disposed which permits scintillation in the absorption of neutron radiation thereby permitting the detector to differentiate neutron radiation from gamma radiation.

2. Description of the Prior Art

Neutron detectors are known in the prior art. Real time personal neutron detectors are required, to name a few examples, for occupational radiation protection at nuclear power plants, nuclear material processing facilities, high-energy particle accelerators, high altitude flights and long-term space missions. In addition, there is a need for detection of neutron radiation at oil well sites, for on-site nuclear monitoring and for dosimetry at nuclear facilities.

One recently discussed neutron detector technique uses a silicone PIN photodiode with a gadolinium-foil converter. The converter emits a number of conversion electrons with energies between 29 and 246 kev and gamma-rays in the range of >231 keV energies per a single neutron capture. The method needs simultaneous measurements of electrons and gamma rays and subtraction of the effect from gamma-interactions. That makes the technique complicated and sensitive to calibration procedure. The gadolinium foil must be thinner than 25 microns to allow electrons to effectively escape from the foil. With 1 cm$^2$ sensitive area, the detector has an efficiency of 5.6% at ideal conditions.

There is another method of measuring thermal neutron fluxes for nuclear monitoring purposes with gas proportional counters but these detectors are sensitive to gamma ray background and have relatively low efficiency in pocket-size configurations. In these detectors, the gas ($^3$He or $BF_3$) is limited in pressure by a few atmospheres because of low electron-ion yield from tracks of decay protons or alpha-particles and technical limitations in the application of sufficiently high voltage for effective charge application in the pressurized gases.

U.S. Pat. No. 3,102,198 describes thermal neutron detectors employing $^3$He gas under pressure in a neutron pervious sealed container. A low voltage power supply is connected by way of a conductor and resistor to a center electrode in the sealed container. This detector is undesirably bulky and sensitive to gamma ray background.

A need exists for an improved detector with high detection efficiency to neutrons of different energies yet having low sensitivity to gamma-ray background.

SUMMARY OF THE INVENTION

The present invention solves the problem by providing a device for efficiently measuring neutron radiation with increased sensitivity. The device can measure both thermal and fast neutrons. The detector has at least two photodetectors working in coincidence forming a gap in between the photodetectors. A substance that permits scintillation in the absorption of neutron radiation is disposed within the gap. A sealed shell can be used to enclose the photodetectors if the substance to be used is a pressurized gas. If a condensed substance is used, no shell would be required. In the embodiment utilizing a gas substance, the shell could be constructed from carbon-fiberglass or aluminum. An example of a pressurized gas that can be employed includes, but is not limited to, $^3$He gas under pressure of about 20 bar. There is no need to apply an electric field within the gap. In the case of thermal neutrons, they can be absorbed by the $^3$He gas thereby producing a proton, a triton and visible light energy that is measured with the photodetectors.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
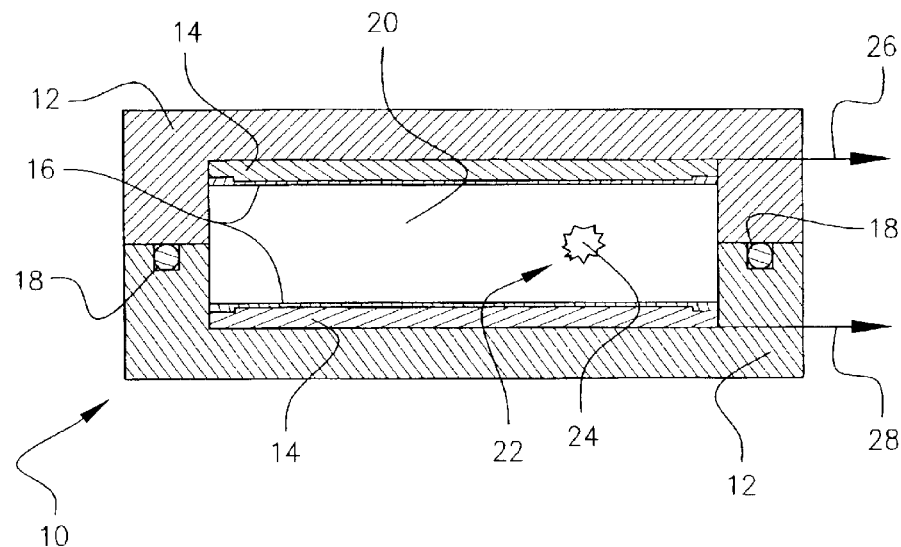
FIG. 1 is a sectional view in elevation of the neutron detector of this invention.

Throughout the following detailed description, the same reference numerals refer to the same elements in all figures.

The neutron detector 10 of FIG. 1 is a small and compact detector having a high sensitivity for use in detecting thermal neutrons. Such a device could be constructed as a pocket sized detector for use by individuals. Detector 10 improves the rejectability that is often seen in prior art devices which are unable to delineate gamma radiation from neutron radiation. In the case where a gas substance is used within detector 10 (to be discussed in further detail hereinafter) an outer pressure-tight closed container (or shell) 12 pervious to transmission therethrough of neutrons in the thermal energy region is employed. The container or shell 12 can be made from aluminum, carbon-fiberglass or other material exhibiting a low neutron absorption. Shell 12 can be a few inches long so it can be hand held or be constructed as a larger unit depending on its application. A sealing gasket 18 is used to ensure that shell 12 is pressure-tight.

Mounted within in shell 12 are at least two photodetectors 14 spaced apart thereby forming a gap 20. Different classes of photodetectors 14 can be employed. For instance, solid state photodetectors can be employed wherein a single photodiode or an array of photodiodes (such as avalanche photodiodes) are employed. An array of photodiodes allows the detector to cover a large area, for example if the detectors are to be wrapped around a moderator (which will be discussed more fully hereinafter). These photodetectors can be constructed from a variety of materials, such as, for example, mercuric iodide, silicon or be gas filled ionization chambers containing a photocathode. The photodetectors could be remotely located and connected to thermal neutron absorbing gaps with light-collection structures, such as, for example, a mirror system of fiber optics. The preferred photodetectors 14 of detector 10, shown in FIG. 1, are avalanche photodiodes made from silicon and are about 25 mm in diameter. However, other classes of photodetectors can be employed in detector 10, such as, for example, gas photodetectors having a gas photomultiplier with an open photocathode. An example of an open photocathode that could be used, but is not limited to, is a CsI (Cesium Iodine) thin polycrystal. Gas photodetectors also allow a large area to be covered and is also efficient wherein the detectors are wrapped around a moderator.

Referring back to FIG. 1, disposed within gap 20, between photodetectors 14, is a substance that permits scintillation in the absorption of neutron radiation. This substance can be either a gas, liquid or solid. As noted above, shell 12 would be employed with those detectors that employ a gas substance, since the gas is pressurized and must maintained within detector 10. However, if a condensed substance is used, shell 12 would not be required.

In the embodiment employing a gas substance, gap 20 is filled under pressure with a gas, such as, for example, helium-3 ($^3$He) or a gas admixture of $^3$He (+0.1% Xenon), $^3$He (+0.1% argon) or $^3$He (+0.1% nitrogen). The pressure varies depending on width of gap 20 between photodetectors 14. For example, the pressure can range from 10 to 100 bars. In the preferred embodiment a gap 20 of about 10 mm is employed and a pressure of 20 bar is used with $^3$He being the preferred substance. In such preferred embodiment, a wave-length shifter organic layer 16 is adhered to the facing surface of each photodetector. Wave-length shifter layer 16 can be a deposition layer of 1,4-diphenylbenzene; p-quaterphenyl, 2-(4-biphenyl)-5-(4-tert-butylphenyl)-1,3, 4-oxadiazole; p-bis 2-(5-phenyloxazoleyl)-benzene or sodium o-hydrooxybenzoate. In the preferred embodiment, a deposition layer of 1,4-diphenylbenzene is preferred as wave-length shifter layer 16. It is understood, that depending on the class of photodetector used and the choice of substance employed within gap 20 that a wave-length shifter layer may or may not be needed. In the preferred embodiment, they are used to lengthen the wave-length of the light flash that occurs within the gap since the initial flash may have a wave-length which is not detectable. For instance, in $^3$He +0.1% Xe gas mixture the initial light flash may only have a wave-length of 170 nm whereas the resulting wave-length of the flash can be increased to about 350 nm with the use of the wave-length shifter layer 16.

When thermal neutron particles 22 enter the detector 10 as shown in FIG. 1, a scintillation light flash 24 occurs as the neutron particles are absorbed by the substance ($^3$He), yielding a triton and proton which share the reaction energy of 764 keV plus the kinetic energy of the incident neutron. Again, no electric field is applied to gap 20.

Figure 2:
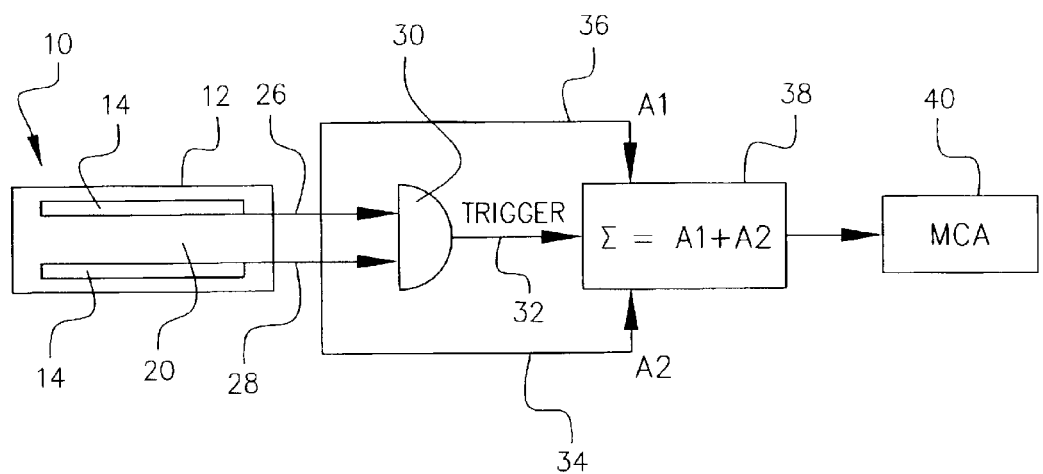
FIG. 2 is a schematic view of the neutron detector readout system.

Photodetectors 14 are connected in coincidence by circuit 26 and 28 as shown in FIG. 2. The proton and triton expend their energy in the substance (i.e., $^3$He gas). The energy deposited in the noble gas generates the flash of scintillation light 24. The preferred gas mixture of $^3$He +0.1% Xe emits 170 nm photons which are effectively absorbed and re-emitted by the wave-shifter 16 to about 350 nm photons. The 350 nm photons are then detected by photodetectors 14. The total signal output 26 and 28 from the photodetectors 14 is proportional to 764 keV average deposited energy from thermal neutrons captured in the gas. The neutron capture scintillation easily rejects direct gamma ray interactions into photodetectors 14 with coincidence selection of events generating simultaneous signals in both photodetectors as seen in FIG. 2. A comparator 30 confirms the signal from photodetectors 14 and triggers 32 an addition of the signals 34 and 36 at station 38 and then directs the joined signal to a multi-channel analyzer 40. If the flash of light is detected by photodetectors 14 at the same time and the amplitude of the signals is approximately the same, then the signal is read and analyzed.

If photodetectors with low quantum efficiency in the ultra-violet region are used, about a 1 micron deposition layer of the wave-length shifter on the input window of photodetectors 14 causes a shift from 170 nm scintillation photons to 350 nm photons detected in photodetectors 14. A wave-length shifter such as 1,4 diphenylbenzene has a density of about 1 g/cm$^3$. The protons generated in the gas as a result of neutrons capture is able to penetrate this organic coating and deposit their kinetic energy directly into photodetectors 14. The scintillation 24 is caused by the protons passing through the organic coating. The effect returns some part of the energy lost by protons and tritons in the organic coating to photodetectors 14.

The efficiency of neutron detection is given by the equation:

$$\epsilon + 1 - \exp{(N\acute{o}_n d)}$$

where density of $^3$He atoms is N+p$\rho_{He3}$/A($^3$He), the trapping cross-section of thermal neutrons is $\acute{o}_{n(}$ ($^3$He)=5,327 barns, and d is the thickness of the gas target. Taking the thickness to be 1 cm, one can calculate the efficiency to be about 94%. The average detection efficiency for isotopically distributed thermal neutron flux is estimated to be about 97%.

The neutron detector described above has about 5.6% detection efficiency, about a 1 cm$^2$ sensitive area, and provides 310 cm$^{-2}$s$^{-1}$ threshold sensitivity to neutron flux limited with detection of gamma-ray background in the range of 50–100 keV. With about 15 times higher detection efficiency, 6 times higher sensitive area, the detector will be about two orders of magnitude more sensitive to thermal neutron flux. Moreover, in the range of the expected neutron signal (~764 keV) the intensity of natural gamma-ray background is at least an order of value less than that in the working range of the reference detector. There is no artificial gamma-ray background from $^3$He target gas.

$^3$He 0.1% Xenon admixture into the target gas could absorb gamma-rays and generate scintillations. However, detection efficiency of the Xenon admixture is about 10$^{-6}$ at the energy range of interest. That makes this kind of background to be negligible.

Figure 3:
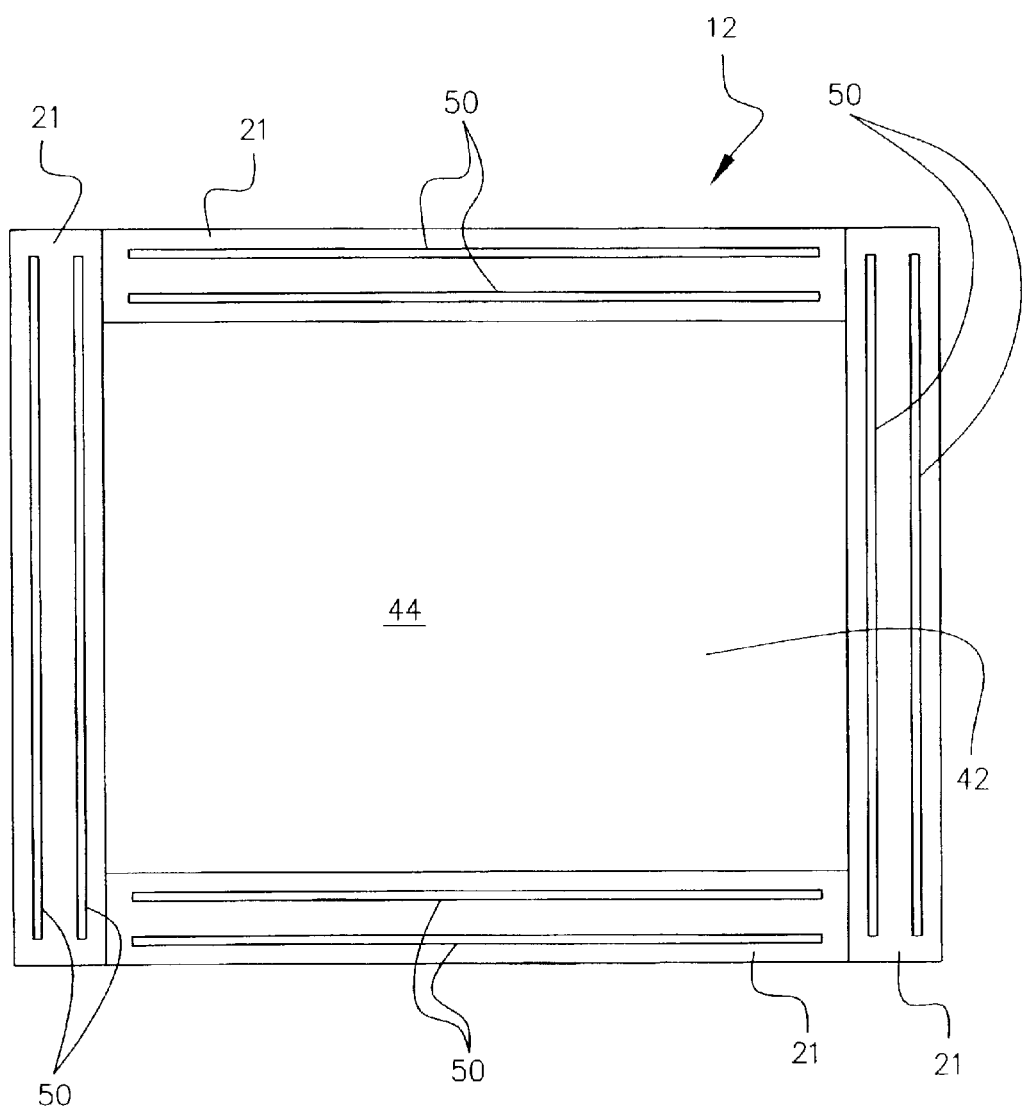
FIG. 3 is a schematic view of a neutron detector having a single set of detectors surrounding a sealed enclosure containing a moderator substance for receipt, detection and recognition of both thermal and fast neutrons.

Referring to FIG. 3, multiple pressure-tight sealed containers 12, like those described in from FIG. 1, can surround a sealed container 42 containing a moderator 44 for detection of both thermal and fast neutrons. Moderator 44 can contain water, polyethylene or any other organic compound containing multiple hydrogen atoms. A low energy neutron beam (thermal neutron) is absorbed in the manner shown in FIGS. 1 and 2 by anyone of the first layer of detectors 21. A high energy neutron 46 (fast neutron) on the other hand, passes through container 12 and is slowed down by moderator 44 and converted to a low energy neutron that can then be recorded by photodetectors 50 sealed in anyone of the first layer of detectors 21 as the neutron beam attempts to pass from out moderator 44 through container 12. In this manner, both thermal and fast neutrons can be detected and measured by a single instrument. Although FIG. 3, illustrates employing photodetectors 21, like those described in FIG. 1, it is understood that other photodetectors could be employed. In fact, a single photodetector could be wrapped around moderator 44. Further, nothing herein limits the use of a square-shaped device since detectors of various shapes could be employed to surround moderator 44.

Figure 4:
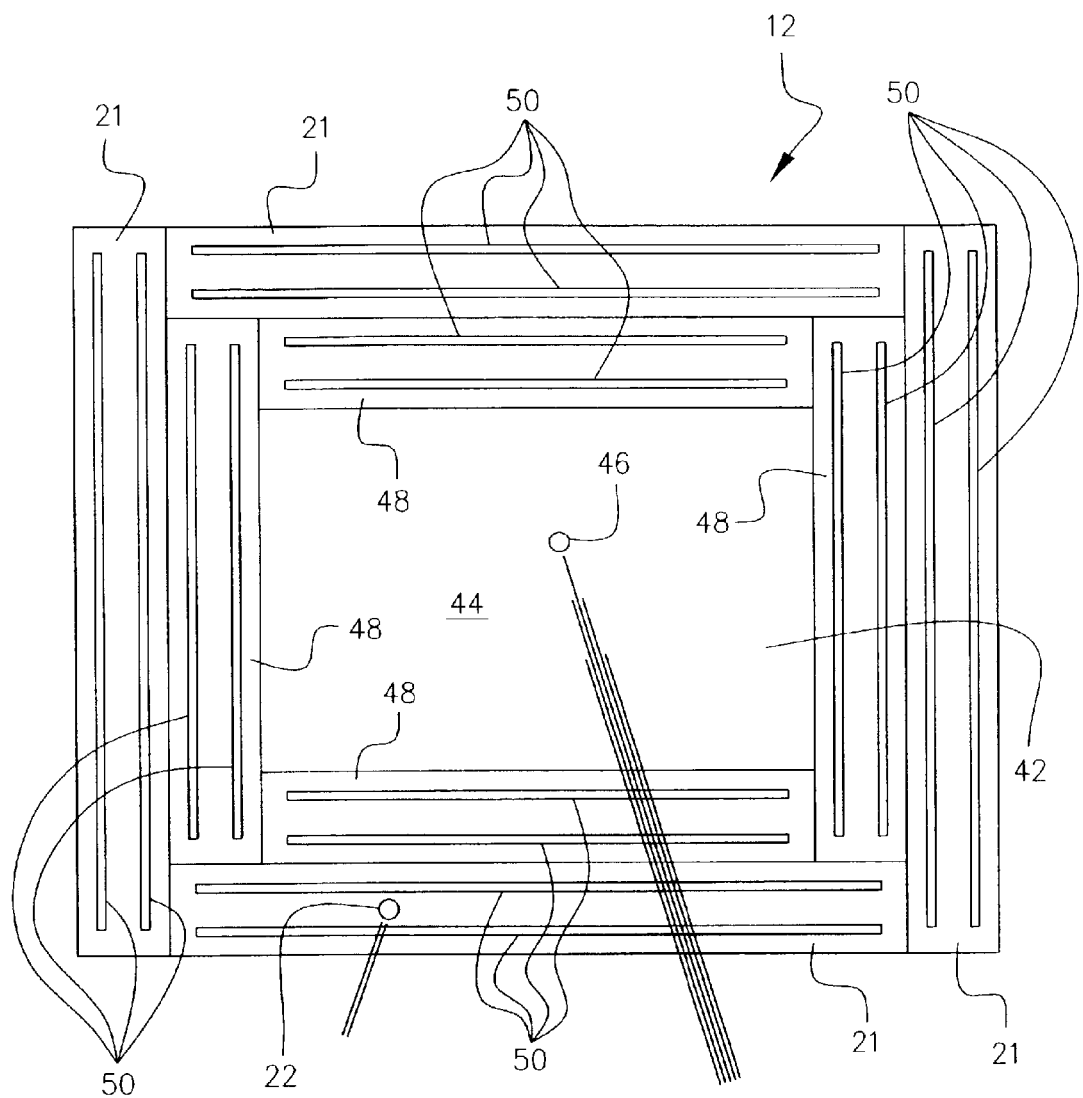
FIG. 4 is a schematic view of a neutron detector having first and second sets of detectors surrounding a sealed enclosure containing a moderator substance for receipt, detection and recognition of both thermal and fast neutrons wherein the detector can determine exactly how many thermal neutrons versus how many fast neutrons were collected by the neutron detector.

Referring to FIG. 4, multiple pressure-tight sealed containers 12, like those described in from FIG. 1, can surround sealed container 42 containing moderator 44 for detection of both thermal and fast neutrons, yet allow for the separate counting of the two type of neutrons. Moderator 44 can again contain water, polyethylene or any other organic compound containing multiple hydrogen atoms. As shown in FIG. 4, a low energy neutron beam 22 (thermal neutron) is absorbed in the manner shown above in FIGS. 1 and 2 by anyone of the first layer of detectors 21. A high energy neutron 46 (fast neutron) on the other hand, passes through container 12, and thereby through both layers of detectors 21 and 48, and is subsequently slowed down by moderator 44 and converted to a low energy neutron that can then be detected by photodetectors 50 sealed in anyone of the second layer of detectors 48 as the neutron beam attempts to pass from out moderator 44 through container 12. In this manner, both thermal and fast neutrons can be measured by a single instrument, wherein thermal neutrons are detected by the first layer of detectors 21 and fast neutrons are detected by the second layer of detectors 48. The embodiment of FIG. 4 thereby allows for the detection and separate counting of both thermal and fast neutrons by determining whether the first layer of detectors 21 or the second layer of detectors 48 recorded the scintillation flash. Again, although FIG. 4, illustrates employing photodetectors 21 and 48, like those described in FIG. 1, it is understood that other photodetectors could be employed. Further, nothing herein limits the use of a square-shaped device since detectors of various shapes could be employed to surround moderator 44.

In yet another alternate embodiment (not shown), more than one moderator could be employed within the neutron detector. For example, a first moderator could be completed surrounded by the first set of detectors 21. A second and third moderator could be positioned at opposed ends of the first set of detectors and the second set of detectors could surround the second and third moderator and the first set of detectors 21 such that at least two sides of the first and second set of detectors, 21 and 48, are positioned juxtaposed to one another.

As noted before, the use of shell 12, as shown in FIG. 1, is needed only if the substance to be disposed in gap 20 is a gas. Accordingly, though FIGS. 3 and 4 illustrate detectors 21 and 48 having pressure-tight sealed enclosures (i.e., shell 12), detectors 21 and 48 could be constructed without a shell so long as the substance disposed within gap 20 is of a condensed nature.

Equivalent elements can be substituted for the ones set forth above to obtain substantially the same result in the same way and by the same function.

What is claimed is:

1. A neutron detector for measuring neutron radiation comprising:
    a) at least first and second photodetectors mounted in a spaced relationship and working in electrical coincidence;
    b) a gap formed between the at least first and second photodetectors;
    c) a substance disposed within the gap which permits scintillation in the absorption of thermal neutron radiation; and
    d) a flash of light is detected by the least first and second photodetectors and is measured by the photodetectors if a comparator electrically coupled to the at least first and second photodetectors determines that the photodetectors measured the flash of light at the approximate same time and an amplitude of a signal of the flash of light is approximately the same.

2. The neutron detector of claim 1, wherein the photodetectors comprise solid state photodiodes.

3. The neutron detector of claim 1, wherein the photodetectors comprise gas photomultipliers with an open photocathode.

4. The neutron detector of claim 1, wherein the photodetectors are remotely located but connected to the gap by light collection structures.

5. The neutron detector of claim 4, wherein the light collection structures are chosen from the group including mirrors and fiber optics.

6. The neutron detector of claim 1, further comprising a pressure-tight sealed enclosure surrounding the at least two photodetectors pervious therethrough to neutron radiation.

7. The neutron detector of claim 6, wherein the substance disposed within the gap is a pressurized gas.

8. The neutron detector of claim 7, wherein the pressurized gas is $^3$He.

9. The neutron detector of claim 7, wherein a wave-length shifter layer is disposed along a window surface of each of the at least first and second photodetectors.

10. The neutron detector of claim 1, wherein the substance disposed within the gap is condensed.

11. A neutron detector for measuring neutron radiation comprising:
    a) at least first and second photodetectors mounted in a spaced relationship and working in electrical coincidence;
    b) a gap formed between the at least first and second photodetectors;
    c) a pressure-tight sealed enclosure surrounding the at least first and second photodetectors;
    c) a pressurized gas disposed within the gap which permits scintillation in the absorption of thermal neutron radiation; and
    d) a flash of light is detected by the least first and second photodetectors and is measured by the photodetectors if a comparator electrically coupled to the at least first and second photodetectors determines that the photodetectors measured the flash of light at the approximate same time and an amplitude of a signal of the flash of light is approximately the same.

12. The neutron detector of claim 11, wherein the pressurized gas is $^3$He.

13. The neutron detector of claim 11, wherein a wavelength shifter layer is disposed along a window surface of each of the at least first and second photodetectors.

14. A neutron detector for measuring thermal and high energy neutron radiation comprising:
    a) at least a first layer of detecting units, each detecting unit having at least a first and second photodetector mounted in a spaced relationship, working in electrical coincidence and forming a gap therebetween;
    b) a substance disposed within the gap which permits scintillation in the absorption of thermal neutron radiation;

c) at least one moderator substance contained within an enclosure for reducing the energy level of all high energy neutron radiation;

d) the at least first layer of detecting units surrounding the at least one moderator contained with the enclosure; and e) the at least first layer of detecting units measuring all thermal neutron radiation as it first enters the neutron detector before it reaches the at least one moderator, and all high energy neutron radiation after it passes through the at least first set of detecting units, enters the at least one moderator and is reduced to thermal neutron radiation and attempts to exit through the at least first set of detecting units.

15. The neutron detector of claim 14, wherein the at least one moderator is an organic material having a high hydrogen content.

16. The neutron detector of claim 14, wherein each detecting unit of the at least first set of detecting units includes a pressure-tight sealed enclosure surrounding the at least first and second photodetectors.

17. The neutron detector of claim 14, wherein the substance disposed in the gap is a pressurized gas.

18. A neutron detector for measuring thermal and high energy neutron radiation comprising:

a) a first and second layer of detecting units, each detecting unit having at least a first and second photodetector mounted in a spaced relationship, working in electrical coincidence and forming a gap therebetween;

b) a substance disposed within the gap which permits scintillation in the absorption of thermal neutron radiation;

c) at least one moderator substance contained within an enclosure for reducing the energy level of all high energy neutron radiation;

d) the first layer of detecting units surrounding the at least one moderator contained with the enclosure; and e) the second layer of detecting units surrounding the first layer of detecting units.

19. The neutron detector of claim 18, wherein the first layer of detecting units measures most of the high energy neutron radiation after it has passed through the at least one moderator and attempts to exit the neutron detector.

20. The neutron detector of claim 18, wherein the second layer of detecting units measures most of the thermal neutron radiation.

* * * * *